US011022999B2

(12) United States Patent
You et al.

(10) Patent No.: US 11,022,999 B2
(45) Date of Patent: Jun. 1, 2021

(54) CLIENT DEVICE AND LOCAL CLOCK SKEW COMPENSATION METHOD THEREOF

(71) Applicant: Center of Human-centered Interaction for Coexistence, Seoul (KR)

(72) Inventors: Bum Jae You, Seoul (KR); Joong Jae Lee, Seoul (KR); Eun Mi Lee, Seoul (KR); Tae Young Lee, Seoul (KR)

(73) Assignee: Center of Human-Centered Interaction for Coexistence, Seoul (KR)

( * ) Notice: Subject to any disclaimer, the term of this patent is extended or adjusted under 35 U.S.C. 154(b) by 118 days.

(21) Appl. No.: 16/335,507

(22) PCT Filed: Sep. 25, 2017

(86) PCT No.: PCT/KR2017/010568
§ 371 (c)(1),
(2) Date: Mar. 21, 2019

(87) PCT Pub. No.: WO2018/056781
PCT Pub. Date: Mar. 29, 2018

(65) Prior Publication Data
US 2020/0019208 A1 Jan. 16, 2020

(30) Foreign Application Priority Data
Sep. 23, 2016 (KR) .......................... 10-2016-0122221

(51) Int. Cl.
*G06F 1/04* (2006.01)
*G06F 1/10* (2006.01)
(Continued)

(52) U.S. Cl.
CPC ................... *G06F 1/10* (2013.01); *G06F 1/12* (2013.01); *H04L 29/06496* (2013.01); *H04W 56/0065* (2013.01); *G06F 1/08* (2013.01)

(58) Field of Classification Search
CPC ......... G06F 1/10; G06F 1/12; H04L 29/6496; H04W 56/65
(Continued)

(56) References Cited

U.S. PATENT DOCUMENTS

2003/0048811 A1\* 3/2003 Robie, Jr. ............. H04J 3/0667
370/509
2006/0209966 A1 9/2006 Walker
(Continued)

FOREIGN PATENT DOCUMENTS

JP 2008-535291 A 8/2008
KR 10-2003-0027253 A 4/2003
(Continued)

*Primary Examiner* — Volvick Derose
(74) *Attorney, Agent, or Firm* — Novick, Kim & Lee, PLLC; Sang Ho Lee; Hyun Woo Shin

(57) ABSTRACT

A local watch skew compensation device of the present invention is a client device which is synchronized with the other client device to provide a time-aware service including: a local time providing unit which supplies first local time data and second local time data in accordance with a local clock; a media scheduling unit which receives first media data and second media data from the other client device, schedules first playout time of the first media data using the first local time data, and schedules second playout time of the second media data using the second local time data; and a skew monitoring unit which requests global time data to a global time server when a difference between the first playout time and the second playout time exceeds a skew threshold value, and the first media data and the second media data are different types of media data.

12 Claims, 8 Drawing Sheets

(51) Int. Cl.
  *G06F 1/12* (2006.01)
  *H04L 29/06* (2006.01)
  *H04W 56/00* (2009.01)
  *G06F 1/08* (2006.01)
(58) Field of Classification Search
  USPC ........................................................ 713/503
  See application file for complete search history.

(56) References Cited

U.S. PATENT DOCUMENTS

| | | | | |
|---|---|---|---|---|
| 2007/0006061 A1* | 1/2007 | Colle | ................ | H04N 21/8166 |
| | | | | 715/255 |
| 2007/0006064 A1* | 1/2007 | Colle | .................. | G11B 27/105 |
| | | | | 715/234 |
| 2007/0008909 A1* | 1/2007 | Tsusaka | ............ | H04N 21/4135 |
| | | | | 370/259 |
| 2007/0250873 A1* | 10/2007 | Ohyama | .............. | H04L 65/608 |
| | | | | 725/82 |
| 2008/0304573 A1* | 12/2008 | Moss | ................. | H04N 21/4622 |
| | | | | 375/240.28 |
| 2009/0059962 A1* | 3/2009 | Schmidt | ............ | H04N 21/4307 |
| | | | | 370/503 |
| 2009/0141142 A1* | 6/2009 | Tsutsui | .................. | G04R 20/02 |
| | | | | 348/222.1 |
| 2009/0144399 A1* | 6/2009 | Schneider | ........... | H04L 12/6418 |
| | | | | 709/220 |
| 2010/0042238 A1* | 2/2010 | Moore | .................... | G06F 3/165 |
| | | | | 700/94 |
| 2010/0189256 A1* | 7/2010 | Doehla | ............... | H04N 21/4307 |
| | | | | 380/217 |
| 2012/0270496 A1* | 10/2012 | Kuenzi | .............. | G07C 9/00309 |
| | | | | 455/41.1 |
| 2013/0061084 A1* | 3/2013 | Barton | ................ | H04L 29/0854 |
| | | | | 713/400 |
| 2013/0129098 A1* | 5/2013 | Gjerde | ................. | G11B 27/034 |
| | | | | 381/63 |
| 2014/0189052 A1* | 7/2014 | Gholmieh | .......... | H04N 21/2408 |
| | | | | 709/217 |
| 2014/0323036 A1* | 10/2014 | Daley | .................... | H04H 20/08 |
| | | | | 455/3.06 |
| 2015/0070211 A1* | 3/2015 | Cheng | ..................... | G01S 19/27 |
| | | | | 342/357.51 |
| 2016/0234544 A1* | 8/2016 | Huang | ..................... | H04N 5/08 |
| 2017/0069338 A1* | 3/2017 | Elliot | ...................... | G10L 19/26 |
| 2017/0272799 A1* | 9/2017 | Hedinsson | ........... | H04N 21/482 |
| 2018/0359508 A1* | 12/2018 | Lindgren | ............ | H04L 65/608 |
| 2019/0064873 A1* | 2/2019 | Carlstedt | ................... | G06F 1/12 |

FOREIGN PATENT DOCUMENTS

| | | |
|---|---|---|
| KR | 10-2006-0083391 A | 7/2006 |
| KR | 10-2010-0029137 A | 3/2010 |
| KR | 10-2015-0011685 A | 2/2015 |

\* cited by examiner

| Media Relations | Threshold of Detected Asynchrony |
|---|---|
| Video – Audio | (-)41 ~ (+)45 |
| Haptic – Video | (-)45 ~ (+)45 |
| Haptic – Audio | (-)25 ~ (+)42 |

Algorithm : Requesting reference time

Input : Reference media time skew($T_r$), Video scheduled time ($T_v$), Audio scheduled time($T_a$)
Client Timestamp($T_0$), Receive Timestamp($T_1$), Transmit timestamp($T_2$), Arrive timestamp($T_3$),
Output : Compensated Time($T_c$) , System time($T_s$)

Start
  1 : begin with requesting message from client to NTP server and set $\alpha$ ($0 < \alpha \leq 1$)value
  2 : repeat
  3 :   if ($\alpha|T_v - T_a| > T_r$)
  4 :     request message to NTP server
  5 :     while received NTP packet
  6 :     end while
  7 :     calculate time offset
  8 :       $T_c = [(T_1 - T_0) + (T_2 - T_3)] / 2$
  9 :     update $T_s \leftarrow T_s + T_c$
 10 : end if
 11 : until system terminated
End

FIG. 9

CLIENT DEVICE AND LOCAL CLOCK SKEW COMPENSATION METHOD THEREOF

TECHNICAL FIELD

The present invention relates to a client device and a local clock skew compensation method thereof.

BACKGROUND

In order to realize a sense of reality through various media sharing and contents-exchange between remote users such as remote video conference or virtual reality, times (clocks) between remote users need to be synchronized. A general time synchronizing method is a method that uses one reference time.

As a typical time synchronizing method, there are NTP and PTP protocols which compensate a clock skew at a constant frequency. For example, the system time synchronization in the Windows environment performs local clock synchronization using the NTP protocol every seven days.

When a method of synchronizing a time at a constant frequency is used, a difference of several seconds (seconds per day) or longer from a reference time is generated until the next synchronizing time depending on the system environment (CPU or an ambient temperature). In a general Windows operating system environment, the time synchronization is performed by using a less number of system resources required for the time synchronization, that is, considering the system efficiency. However, for a time-aware(time-sensitive) service(services) which is(are) largely affected by the time accuracy such as finance or broadcasting, time synchronization is performed using a Linux operating system and constantly monitoring the clock skew. This is a way to focus on the accuracy of the local time while taking a drawback of the increased system load.

The efficiency and the accuracy are directly associated with the utilization of resources (a network load or a system load) of the user environment. That is, when the compensation time interval is short to maintain a small offset between the reference time and the user's time, the time accuracy is guaranteed but the system resource utilization efficiency is lowered. For example, a user who only surfs the Internet may ignore errors of hundreds of milliseconds but in the case of a service (time-sensitive services) which has a high time dependency such as stock trading, a difference of hundreds of milliseconds may cause disadvantages more than monetary loss. Therefore, when various media data are transmitted for interaction between remote users, instead of a fixed time synchronizing method. The method adaptively adjusts the accuracy of the time synchronization and considers a system resource usage efficiency.

Patent Document 1 (Korean Unexamined Patent Application Publication No. 10-2015-0011685 (Feb. 2, 2015)) discloses a time synchronization management system using NTP.

DISCLOSURE

Technical Problem

An object to be achieved by the present invention is to provide a client device and a local clock skew compensation method thereof which adaptively change a time synchronizing frequency using a synchronization tolerance between media data to simultaneously achieve the accuracy of the time synchronization and the efficiency of the system resource usage.

Technical Solution

According to an exemplary embodiment of the present invention, a client device is a client device which is synchronized with the other client device to provide a time-aware service and includes a local time providing unit which supplies first local time data and second local time data in accordance with a local clock; a media scheduling unit which receives first media data and second media data from the other client device, schedules a first playout time of the first media data using the first local time data, and schedules a second playout time of the second media data using the second local time data; and a skew monitoring unit which requests global time data to a global time server when a skew amount corresponding to a difference between the first playout time and the second playout time exceeds a skew threshold value (i.e. inter media synchronization skew) and the first media data and the second media data are different types of media data.

The client device may further include: a database in which the skew threshold value in accordance with types of the first media data and the second media data is stored.

The skew monitoring unit may include: a skew amount calculating unit which calculates the skew amount between the first media data and the second media data using the first playout time and the second playout time; a skew amount comparing unit which compares the skew threshold value and the skew amount; and a global time requesting unit which requests the global time data to the global time server when the skew amount exceeds the skew threshold value.

The skew amount comparing unit may compare a value obtained by multiplying a weight value and the skew amount with the skew threshold value.

The client device may further include: a local clock compensation unit which receives the global time data to compensate the local clock.

The client device may further include: a rendering unit which playouts the first media data and the second media data in accordance with the first playout time and the second playout time.

The inter media synchronization skew threshold value is the maximum skew value at which a user does not perceive the asynchronous rendering of the first media data and the second media data.

Types of the first media data and second media data is one of video and audio type, haptic and video type, and haptic and audio type.

The first media data and the second media data is media data captured from a corresponding sensor of the other client device.

According to one exemplary embodiment of the present invention, a local clock skew compensation method which is performed in a client device which is synchronized with the other client device to provide a time-aware service includes: receiving first media data and second media data captured by a sensor of the other client device; scheduling a first playout time of the first media data using the first local time data, and scheduling a second playout time of the second media data using the second local time data; and compensation the local clock by requesting global time data to a global time server when a skew amount corresponding to a difference between the first playout time and the second playout time exceeds a skew threshold value and the first media data and the second media data are different types of media data.

The local clock skew compensation method may further include: compensation a local clock of the client device by requesting the global time data to the global time server at the beginning of the time-aware service.

The inter media synchronization skew threshold value is a maximum skew value at which a user does not perceive asynchronous rendering of the first media data and the second media data.

Types of the first media data and second media data is one of video and audio type, haptic and video type, and haptic and audio type.

Advantageous Effects

According to the present invention, a client device and a local clock skew compensation method thereof adaptively change a time compensation frequency using a tolerance of human perception of synchrony between media data to simultaneously achieve the accuracy of the time synchronization and the efficiency of the system resource usage.

DESCRIPTION OF DRAWINGS

FIG. 9 is a view illustrating a pseudo code which requests global time data according to one exemplary embodiment of the present invention.

BEST MODE

Figure 1:
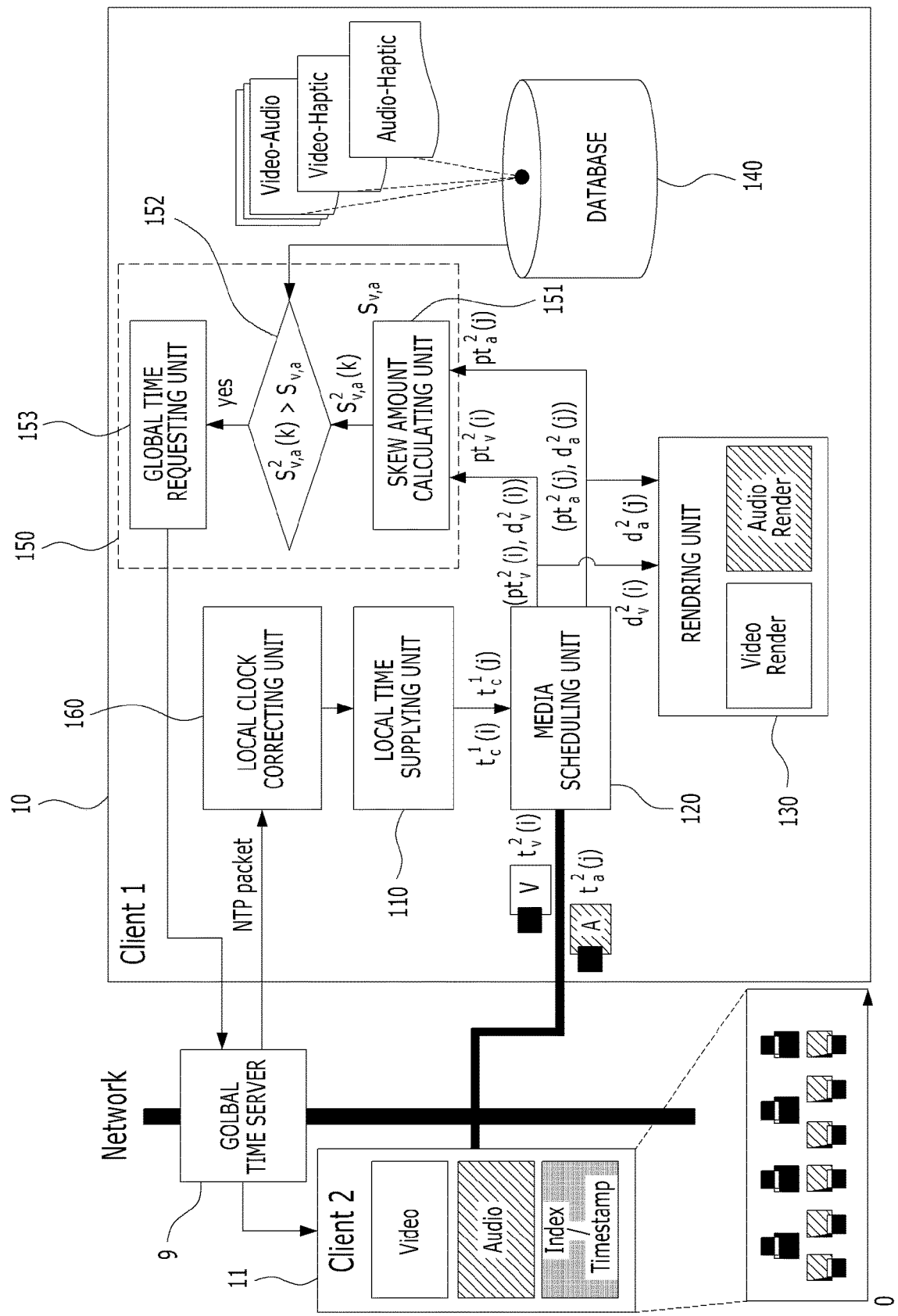
FIG. 1 is a view for explaining a client device according to one exemplary embodiment of the present invention.

Hereinafter, exemplary embodiments of the present invention will be described more fully with reference to the accompanying drawings for those skilled in the art to easily implement the present invention. As those skilled in the art would realize, the described embodiments is modified in various different ways, all without departing from the spirit or scope of the present invention.

In order to clearly describe the present disclosure, parts not related to the description will be omitted. Like reference numerals designate like elements throughout the specification. Therefore, reference numerals which are used in previous drawings is used for another drawing.

The size and thickness of the components shown the drawings are optionally determined for better understanding and ease of description, and the present invention is not limited to the examples shown in the drawings. In the drawings, thicknesses of several layers and regions are enlarged for clear expressions.

FIG. 1 is a view for explaining a client device according to one exemplary embodiment of the present invention.

Referring to FIG. 1, a client device 10 according to one exemplary embodiment of the present invention includes a local time providing unit 110, a media scheduling unit 120, and a skew monitoring unit 150. According to an exemplary embodiment, the client device 10 may further include a database 140, a local clock compensation unit 160, and a rendering unit 130.

The client device 10 is synchronized with the other client device 11 to provide a time-aware service. In this case, the client device 10 and the other client device 11 may use global time data of a global time server 9 as a synchronization reference time.

The client device 10 is a computing device which includes at least one processor and a memory. The local time providing unit 110, the media scheduling unit 120, the skew monitoring unit 150, the database 140, the local clock compensation unit 160, and the rendering unit 130 of the client device 10 which will be described below is units which distinguish the computing device as hardware, but is units which distinguish the computing device as software.

The time aware service is a real-time service in which time synchronization is a very important factor and may include a remote video conference service, a virtual reality service, and a game service.

The global time server 9 is a network time protocol (NTP) server. The global time data is an NTP packet.

Hereinafter, it is assumed that the client device 10 receives video data and audio data from the other client device 11 to playout the video data and the audio data to a user who uses the client device 10. The following process is applied to a case when the other client device 11 receives the video data and the audio data from the client device 10 in the same way.

In the present exemplary embodiment, it is assumed that the first media data is video data and the second media data is audio data. In another exemplary embodiment, the first media data is haptic data and the second media data is video data. In still another exemplary embodiment, the first media data is haptic data and the second media data is audio data. With respect to full HD video, the video data is captured with a size of approximately 6 MB at 30 fps and the audio data is captured with a size of approximately 2 KB at 43 fps.

Here, the capturing means a process of acquiring media data by a corresponding sensor of the other client device 11. For example, the video data is acquired using a camera sensor and the audio data is acquired using a microphone sensor. In the present exemplary embodiment, it is exemplified that the media data is transmitted from the other client device 11 to the client device 10. Therefore, even though the capturing is described with respect to the other client device 11, the client device 10 is also required to include a corresponding sensor in a bi-directional service such as remote video conference.

The local time providing unit 110 supplies first local time data $t_c^1(i)$ and second local time data $t_c^1(j)$. That is, the local time providing unit 110 may supply a system time (hereinafter, referred to as local time data) based on a local clock of the client device 10.

The first local time data $t_c^1(i)$ and the second local time data $t_c^1(j)$ refer to local time data corresponding to a requested time when a local time is required for data processing in the media scheduling unit 120 or other function units. That is, when the requested times are different, the first local time data $t_c^1(i)$ and the second local time data $t_c^1(j)$ is different from each other. For example, the first local time data $t_c^1(i)$ is local time data at an i-th requested time and the second local time data $t_c^1(j)$ is local time data at a j-th requested time.

The media scheduling unit 120 receives first media data and second media data from the other client device 11 and schedules a first playout time $pt_v^2(i)$ of the first media data using the first local time data $t_c^1(i)$ and schedules a second playout time $pt_a^2(j)$ of the second media data using the second local time data $t_c^1(j)$. This will be described in more detail below with reference to FIG. 2.

The time $t_v^2(i)$ illustrated in FIG. 1 is a time when i-th first media data is received and the time $t_a^2(j)$ means a time when j-th second media data is received.

The rendering unit 130 renders the first media data $d_v^2(i)$ and the second media data $d_a^2(j)$ in accordance with the first playout time $pt_v^2(i)$ and the second playout time $pt_a^2(j)$. The first media data $d_v^2(i)$ and the second media data $d_a^2(j)$ is data to which a scheduling process is subjected by the media scheduling unit 120 to be rendered at the first playout time $pt_v^2(i)$ and the second playout time $pt_a^2(j)$.

The first media data and the second media data which are received by the media scheduling unit 120 and the first media data $d_v^2(i)$ and the second media data $d_a^2(j)$ which will be rendered by the rendering unit 130 may have different specific data formats in the software processing step. However, the first media data and the second media data are common because the first media data is a first type of i-th media data (for example, i-th video data) and the second media data is a second type of j-th media data (for example, j-th audio data). Therefore, in this specification, the same name are used for the first media data and the second media data in each step of the media scheduling unit 120 and the rendering unit 130.

The rendering unit 130, for example, renders the first media data $d_v^2(i)$ which is video data at the first playout time $pt_v^2(i)$ by means of a display device and playout the second media data $d_a^2(j)$ which is audio data at the second playout time $pt_a^2(j)$ by means of a speaker device.

The database 140 may store an inter media synchronization skew threshold value $S_{v,a}$ in accordance with the types of the first media data $d_v^2(i)$ and the second media data $d_a^2(j)$.

The inter media synchronization skew threshold value $S_{v,a}$ (i.e. the difference between the first playout time $pt_v^2(i)$ and the second playout time $pt_a^2(j)$) is the maximum skew value at which the user does not perceive the asynchronous rendering of the first media data $d_v^2(i)$ and the second media data $d_a^2(j)$.

For example, when the user feels that a video displaying that a lip of a person displayed through the display device moves and audio of a person heard from the speaker do not match with each other, it is considered that the user recognizes the asynchronous playout. As another example, when the first media data is haptic data and the second media data is video data, if it is displayed that a user on a virtual reality collides with a specific object, but the user feels that a haptic stimulus such as vibration is not provided in accordance with the timing, it is considered that the user recognizes the asynchronous playout.

The user may have a tolerance range that does not recognize the asynchronous playout in accordance with the types of the first media data and the second media data and a boundary value of the tolerance range is determined as a inter media synchronization skew threshold value $S_{v,a}$.

The inter media synchronization skew threshold value is acquired by the ground truth through user studies, which will be described in more detail with reference to FIG. 7.

When a inter media synchronization skew amount $S_{v,a}^2(k)$ corresponding to the difference between the first playout time $pt_v^2(i)$ and the second playout time $pt_a^2(j)$ exceeds the inter media synchronization skew threshold value $S_{v,a}$, the skew monitoring unit 150 requests global time data to the global time server 9.

The skew monitoring unit 150 may include a skew amount calculating unit 151 which calculates a inter media synchronization skew amount $S_{v,a}^2(k)$ between the first media data $d_v^2(i)$ and the second media data $d_a^2(j)$ using the first playout time $pt_v^2(i)$ and the second playout time $pt_a^2(j)$, a skew amount comparing unit 152 which compares the inter media synchronization skew threshold value $S_{v,a}$ and the inter media synchronization skew amount $S_{v,a}^2(k)$, and a global time requesting unit 153 which requests global time data NTP packet to the global time server 9 when the inter media synchronization skew amount $S_{v,a}^2(k)$ exceeds the inter media synchronization skew threshold value $S_{v,a}$.

For example, even though the second playout time $pt_a^2(j)$ needs to be implemented after 5 ms from the first playout time $pt_v^2(i)$, when the second playout time $pt_a^2(j)$ is implemented after 7 ms from the first playout time $pt_v^2(i)$, the skew amount calculating unit 151 may calculate (+)2 ms as the inter media synchronization skew amount $S_{v,a}^2(k)$.

The skew amount comparing unit 152 may compare a value obtained by multiplying a weight value α and the inter media synchronization skew amount $S_{v,a}^2(k)$ with the inter media synchronization skew threshold value $S_{v,a}$. The weight value α is set to be suitable for a media characteristic such as an accuracy for errors and efficiency of resource utilization, which will be described in detail below with reference to FIG. 7.

The local clock compensation unit 160 receives global time data to compensate a local clock. When the local time is synchronized with the global time, a delay time offset which is accumulated for the media data so that the first media data and the second media data are synchronized to provide a high quality service to the user. This will be described in more detail below with reference to FIG. 5.

Figure 2:
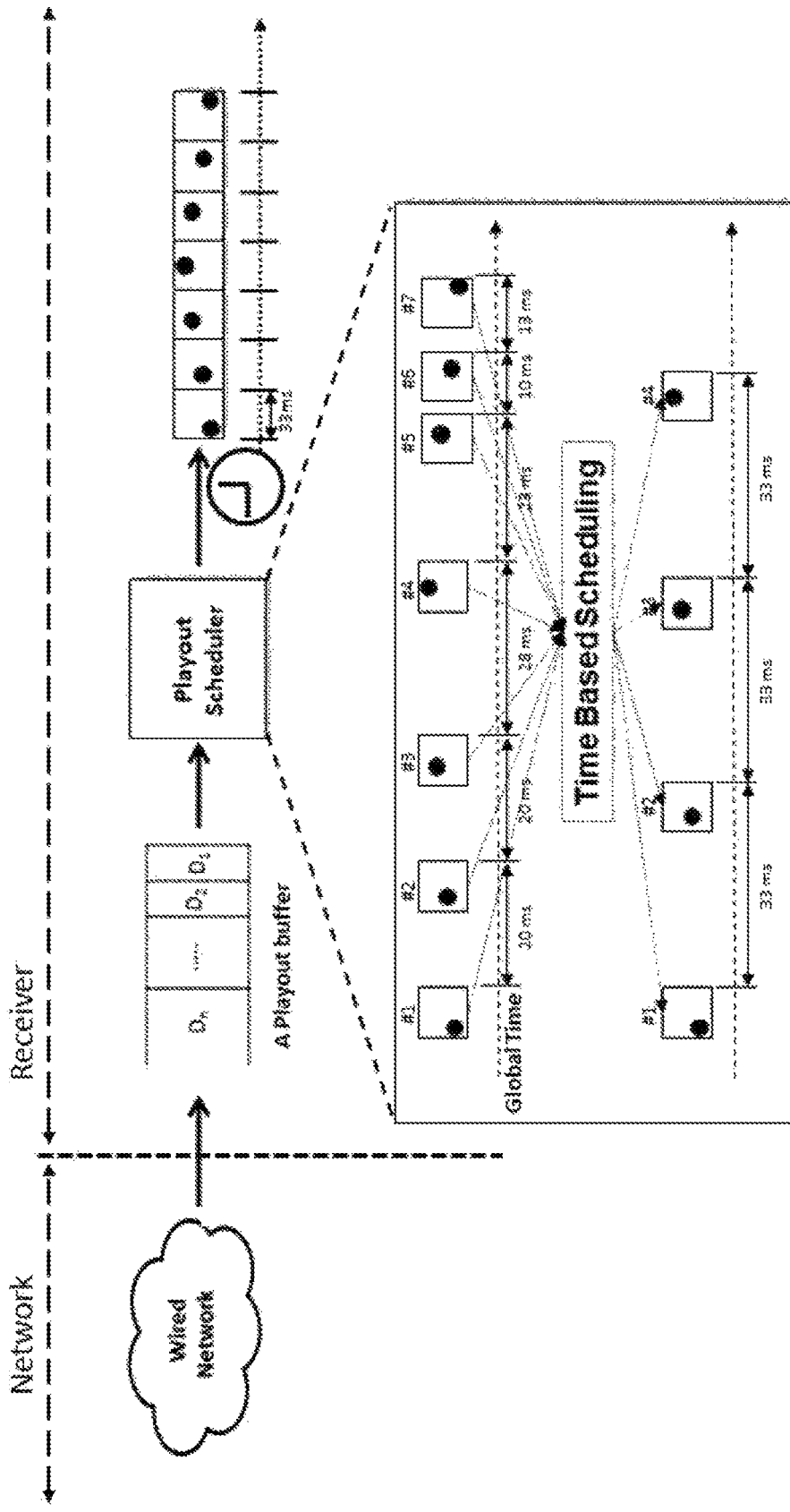
FIG. 2 is a view for explaining a function of a media scheduling unit according to one exemplary embodiment of the present invention.

FIG. 2 is a view for explaining a function of a media scheduling unit according to one exemplary embodiment of the present invention.

Referring to FIG. 2, time-stamp based media data scheduling is illustrated.

The media scheduling unit 120 may schedule a playout time for the first media data and the second media data which are received and buffered through a network. The media scheduling is performed using an index and a time stamp which are included in each media data (see FIG. 1). Since the reception time of the media data continuously changes, a module which renders the media data in accordance with a captured order and a capturing time interval is necessary and the media scheduling unit 120 serves as the module.

The reason why the reception time of the media continuously changes is largely affected by the sensor and the system. This will be described below with reference to FIG. 3.

Figure 3:
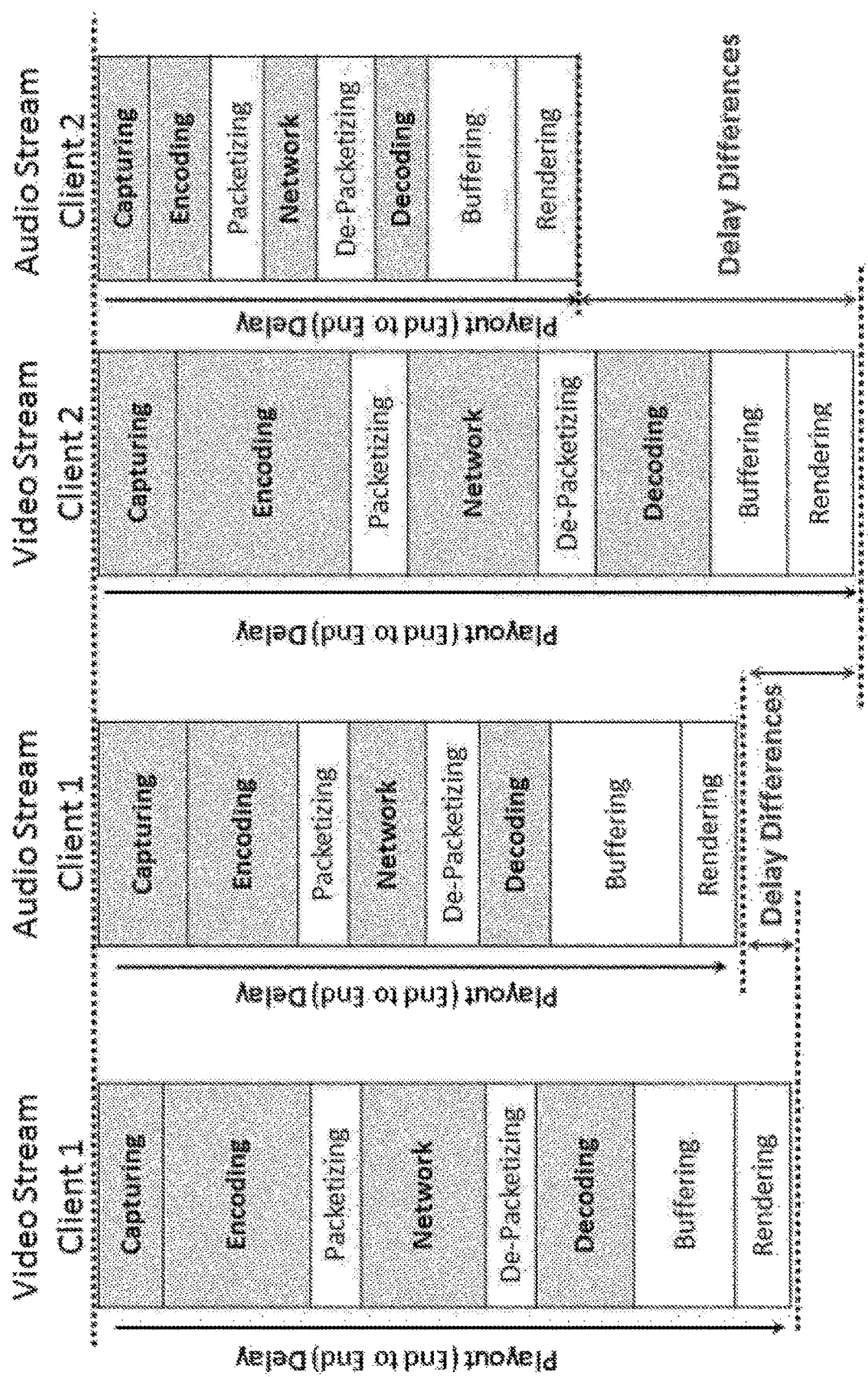
FIG. 3 is a view for explaining a delay element in which a clock skew between media data is generated.

FIG. 3 is a view for explaining a delay element in which a clock skew between media data is generated.

Referring to FIG. 3, a total delay time for a stream of media data supplied from the first client device client 1 and the second client device client 2 is illustrated. Each media data is subjected to capturing, encoding, packetizing, networking, de-packetizing, decoding, buffering, and rendering processes.

For example, video data captured by the camera sensor of the first client device client 1 is subjected to the above-mentioned intermediate processes and then finally rendered by the display device of the second client device client 2.

The delay elements are mainly classified into four elements including media capturing time change, encoding time delay, network transmission time delay, and decoding time delay. Referring to FIG. 3, a size of each delay element is illustrated.

When the data is rendered without considering the delay elements, that is, without performing the media scheduling process, the media playout quality cannot be guaranteed and in some cases, the service cannot be used.

However, among four delay elements, the encoding time delay, the network transmission time delay, and the decoding time delay element, excluding the media capturing time change, are generally reduced using hardware rather than software and are less affected by the reference time.

Figure 4:
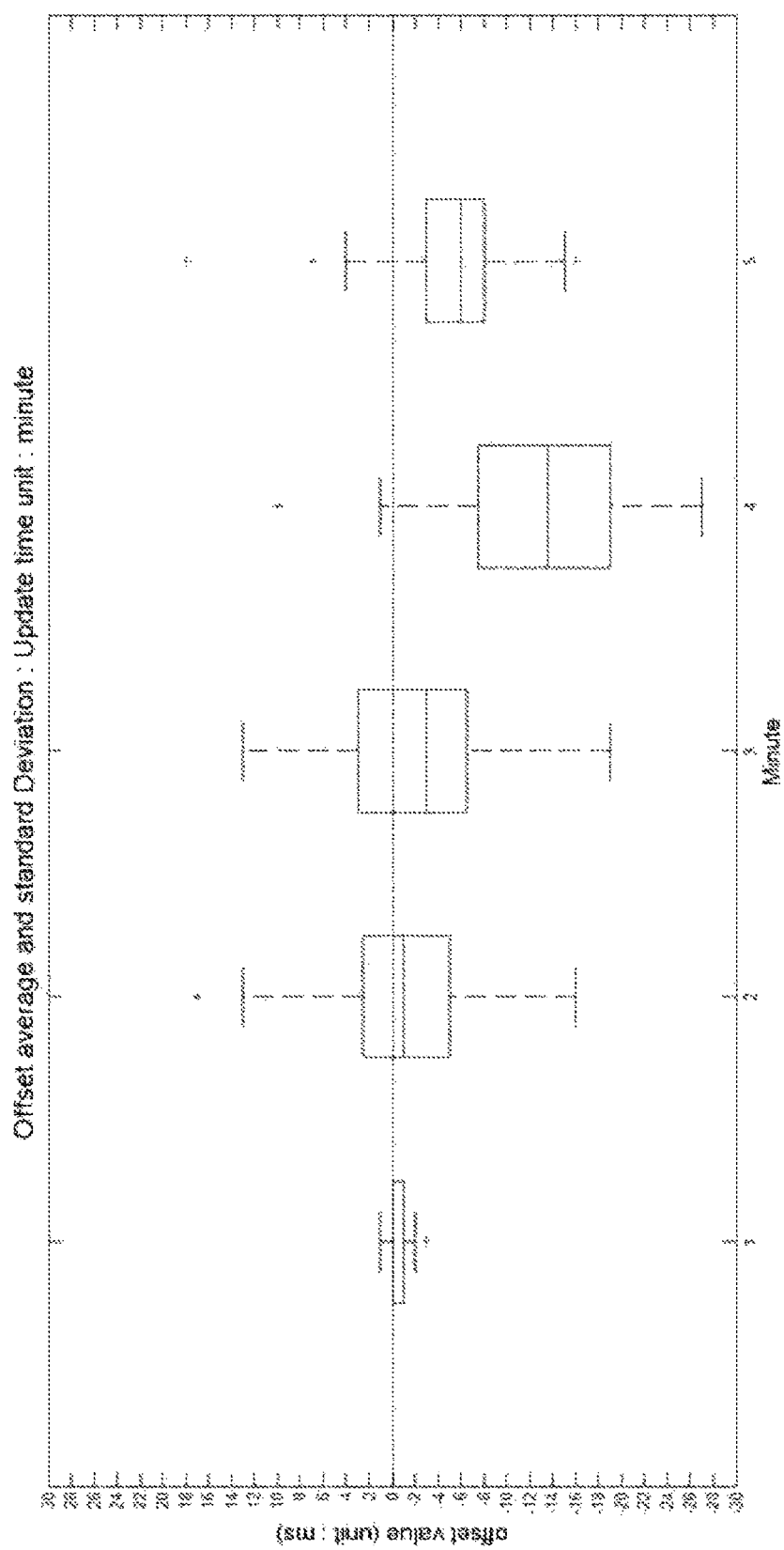
FIG. 4 is a view for explaining a different between a global time and a local time.

FIG. 4 is a view for explaining a different between a global time and a local time.

Referring to FIG. 4, a graph obtained by measuring a difference between the global time and the local time for 24 hours or longer in the unit of minute is illustrated.

Referring to the graph of FIG. 4, a time of the client may have an error of (−) 28 ms at the most as compared with the global time. By doing this, it is understood that when the media capturing time is determined using a local time, a time error is constantly generated and accumulated.

Figure 5:
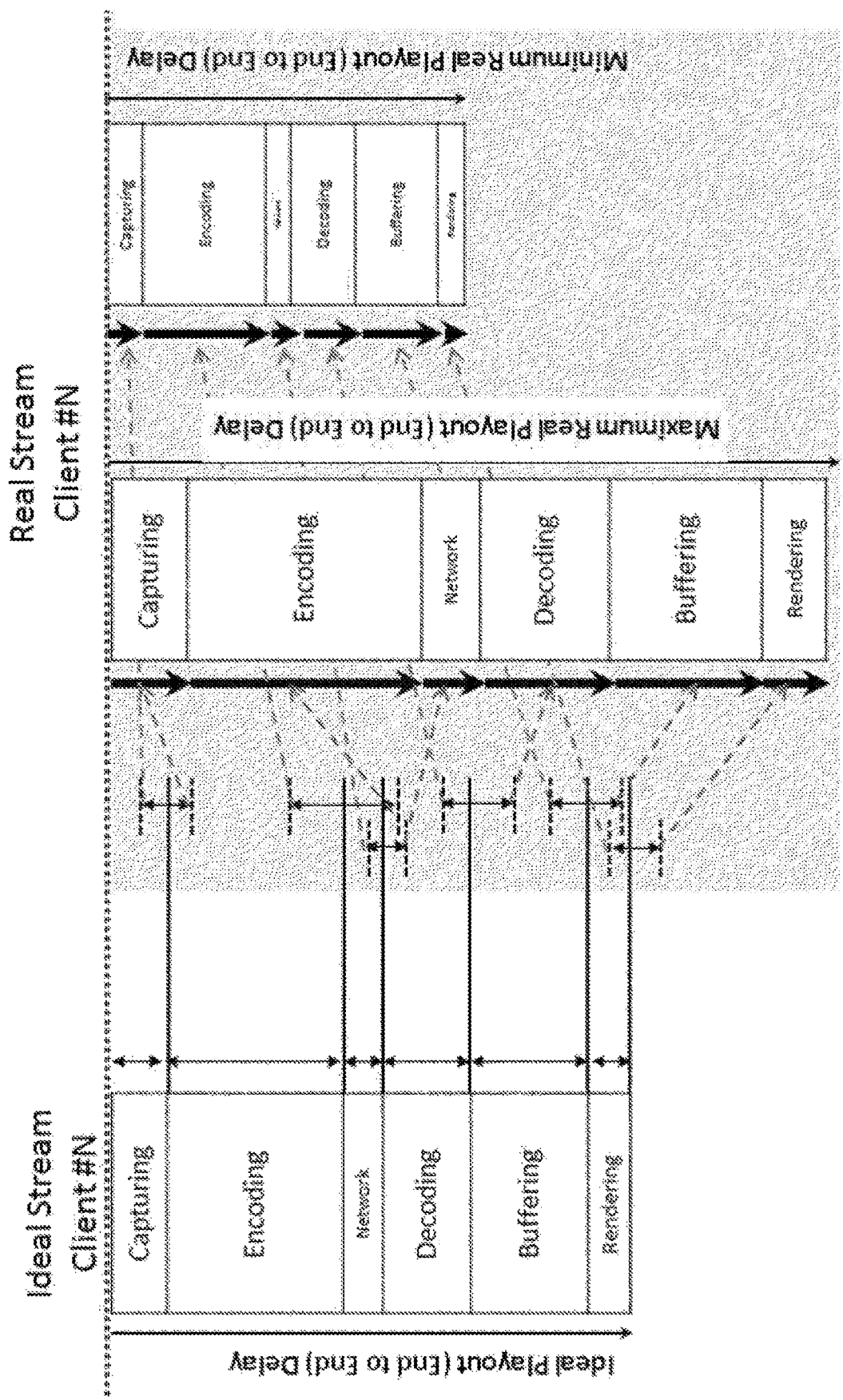
FIG. 5 is a view for explaining a difference in total delay time which is generated in a real media data stream.

FIG. 5 is a view for explaining a difference in total delay times which is generated in a real media data stream.

Referring to FIG. 5, as compared with ideal media data stream, maximum real playout delay and minimum real playout delay which is generated in the real media data stream are illustrated.

In an ideal case, during the media synchronization, an accurate delay time for every module (capturing, encoding, networking, decoding, and rendering modules) is calculated to be reflected to a media synchronization delay offset. However, during the real media synchronization, environments (CPU, ambient temperature, and priority of a system) are constantly changed for every client so that the reference time is affected, which causes a large time difference between clients. Therefore, the media synchronization error is largely affected thereby.

Figure 6:
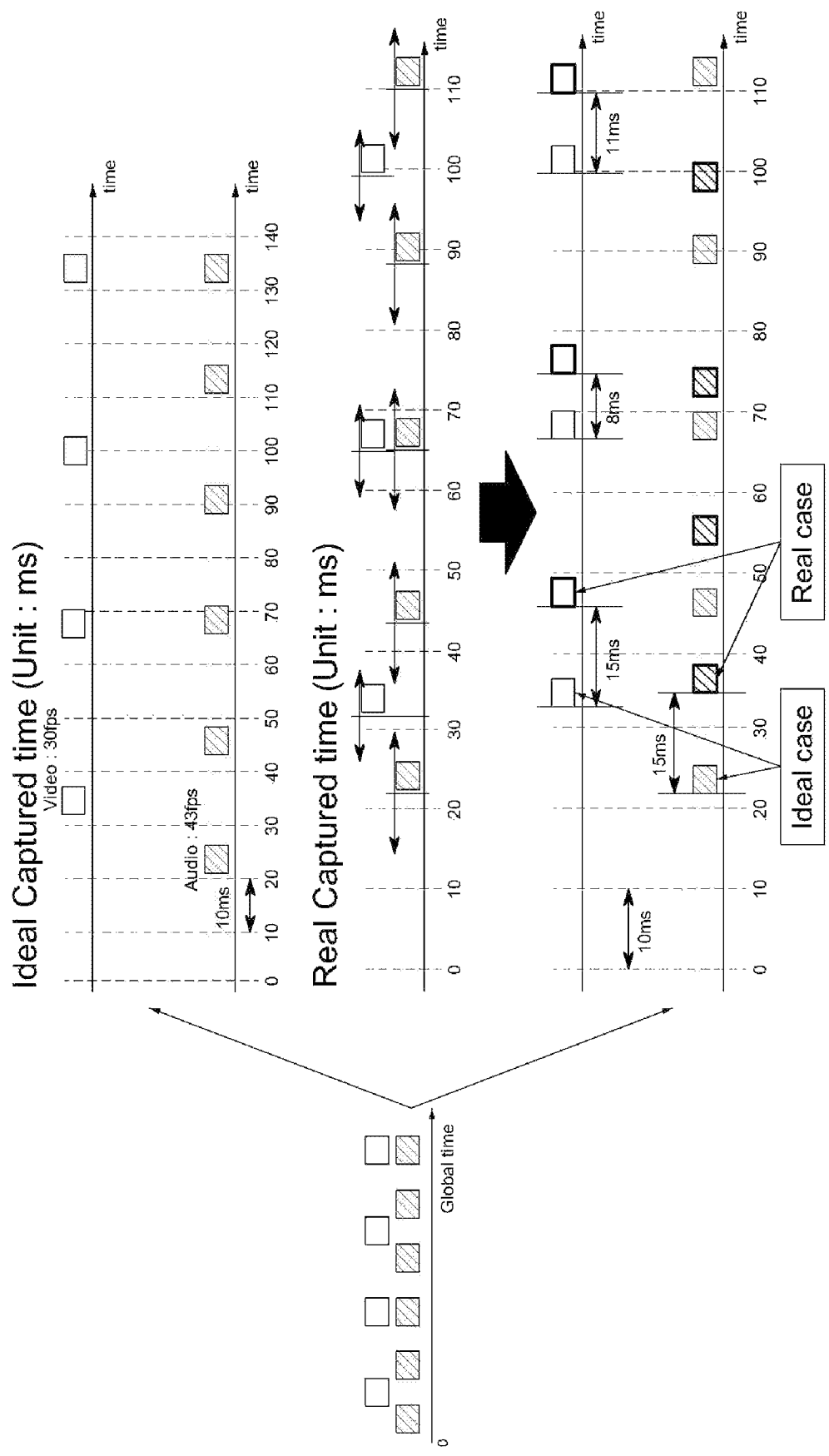
FIG. 6 is a view for explaining a clock skew between media.

FIG. 6 is a view for explaining a clock skew between media.

Referring to FIG. 6, an ideal captured time when the media data is captured using a global time and a real captured time when the media data is captured using a local time are compared.

The clock skew between media is affected by the sensor and the system environment during the media acquiring process. For example, when the priority of the data capturing processing is lowered due to the change of the thread priority of the system, it may affect the capturing frequency. The clock skew between media, in particular, is caused by a fact that the offset between the global time and the local time is increased in accordance with the time. That is, when the local time is fluctuated, a difference between ideal and real media data capturing times is generated and constantly accumulated.

In an ideal case, the video data which is the first media data is constantly captured at 30 fps. However, in the real case, the local time is fluctuated so that the video data cannot maintain a constant capturing interval of 30 fps. As illustrated in the drawing, the ideal case and the real case have irregular error intervals of 15 ms, 8 ms, and 11 ms.

Similarly, the audio data which is the second media data also has an irregular error interval as compared with the ideal case.

The error intervals generated in the first media data and the second media data are caused by the clock skew phenomenon between the first media data and the second media data.

Figures 7, 8:
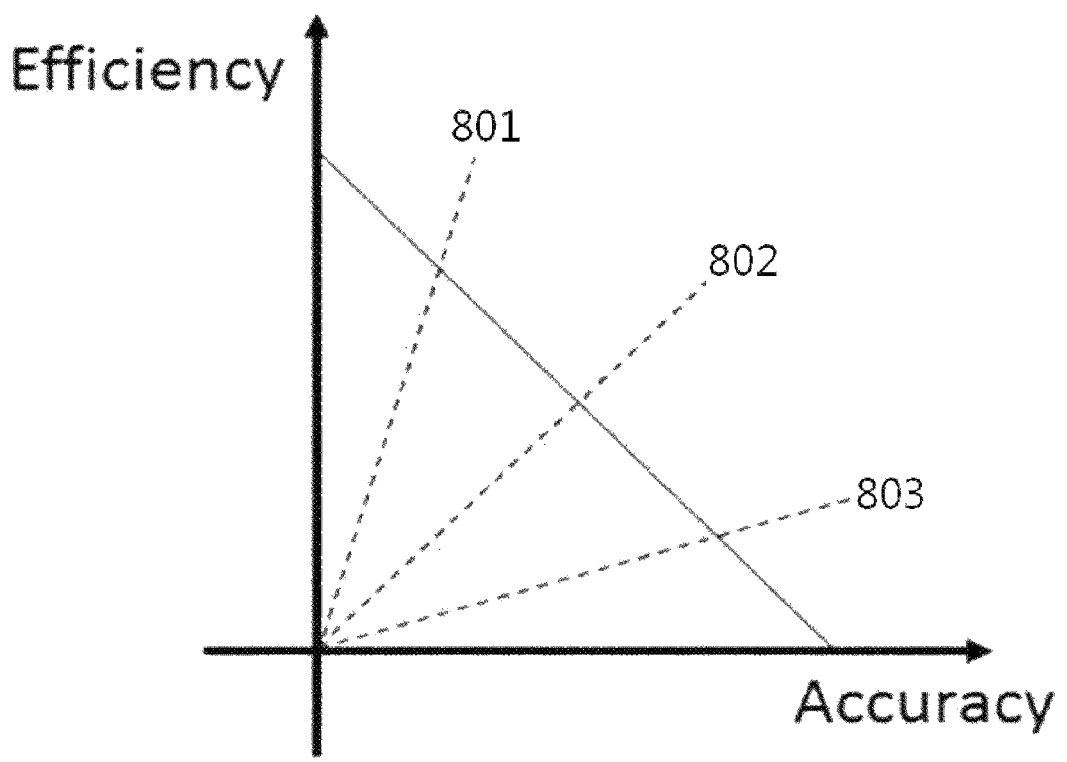
FIG. 7 is a view for explaining an example of a skew threshold value stored in a database according to one exemplary embodiment of the present invention.
FIG. 8 is a view for explaining aspects of efficiency and accuracy in accordance with a time synchronizing frequency.

FIG. 7 is a view for explaining an example of a skew threshold value stored in a database according to one exemplary embodiment of the present invention.

As described above, the skew threshold value is obtained by the ground truth through user studies and in the table of FIG. 7, exemplary skew threshold values for three types of media pair are illustrated.

For example, when the first media data is video data and the second media data is audio data, the skew threshold values of the audio data with respect to the video data is (−)41 ms and (+)45 ms. That is, the user may recognize inter-media asynchronization when matching audio data is output (−)41 ms or earlier than specific video data which is displayed through a speaker or delayed by (+)45 ms or more.

When the first media data is haptic data and the second media data is video data, the skew threshold values of the video data with respect to the haptic data is (−)45 ms and (+)45 ms. That is, the user may recognize inter-media asynchronization when matching video data is displayed (−)45 ms or earlier than specific haptic data which provides tactile sense through a display device or delayed by (+)45 ms or more.

When the first media data is haptic data and the second media data is audio data, the skew threshold values of the audio data with respect to the haptic data is (−)25 ms and (+)42 ms. That is, the user may recognize inter-media asynchronization when matching audio data which is output (−)25 ms or earlier than specific haptic data which provides tactile sense through a speaker or delayed by (+)42 ms or more.

FIG. 8 is a view for explaining aspects of efficiency and accuracy in accordance with a time synchronizing frequency.

When the time synchronizing frequency is determined, as illustrated by the line 801 of FIG. 8, an efficiency side is emphasized so that a maximum error range is utilized or as illustrated by the line 803, an accuracy side is emphasized so that only a minimum error range is allowed. Alternatively, as illustrated by the line 802, an intermediate value thereof is used.

That is, it is divided into an efficiency side for utilizing a system resource between remote users and an accuracy side for reproducing shared media. A tolerance range in accordance with media characteristics needs to be determined and then reflected to the time synchronizing frequency. For example, when a time skew (clock skew) between media is small or a data capturing frequency is low, a compensation frequency is prolonged in consideration of the efficiency. In contrast, when the time skew between media is frequent and the data capturing frequency is high, the compensation frequency needs to be shortened in consideration of accuracy so that the compensation frequency needs to be adaptively adjusted to the environment.

When the weight value α is set to correspond to the line 802, the skew amount comparing unit 152 may set the weight value α to have a value between 0 and 1. When the weight value α is set to correspond to the line 801, the skew amount comparing unit 152 may set the weight value α to have a value close to 0. When the weight value α is set to correspond to the line 803, the skew amount comparing unit 152 may set the weight value α to have a value close to 1.

The weight value α is set in advance in accordance with the type of time-aware service or is set by a user, depending on the exemplary embodiments.

FIG. 9 is a view illustrating a pseudo code which requests global time data according to one exemplary embodiment of the present invention.

Referring to FIG. 9, the client device 10 uses a table of FIG. 7 to determine the time synchronizing frequency and determine the time synchronizing frequency using a current skew amount and the weight value α.

The weight value α is a value larger than 0 and 1 or smaller. When the weight value α is closer to 1, the time synchronizing frequency is determined by focusing on the accuracy and when the condition is satisfied, the client device 10 may request the time synchronization to the global time server 9.

The referenced drawings and described detailed description of the present invention are the exemplary of the present invention and are used for the purpose of merely describing the present invention, not limiting the scope of the present invention which is included in the appended claims. Therefore, it will be appreciated to those skilled in the art that various modifications are made and other equivalent embodiments are available. Accordingly, the actual scope of the present invention must be determined by the spirit of the appended claims.

The invention claimed is:

1. A client device which is synchronized with an other client device to provide a time-aware service, the client device comprising:
   a local time providing unit which supplies first local time data and second local time data in accordance with a local clock;
   a media scheduling unit which receives first media data and second media data from the other client device, schedules a first playout time of the first media data using the first local time data, and schedules a second playout time of the second media data using the second local time data; and
   a skew monitoring unit which requests global time data to a global time server when a skew amount corresponding to a difference between the first playout time and the second playout time exceeds a skew threshold value,
   wherein the first media data and the second media data are different types of media data, and the skew threshold value in accordance with types of the first media data and the second media data is stored in a database.

2. The client device of claim 1, wherein the skew monitoring unit includes:
   a skew amount calculating unit which calculates the skew amount between the first media data and the second media data using the first playout time and the second playout time;
   a skew amount comparing unit which compares the skew threshold value and the skew amount; and
   a global time requesting unit which requests the global time data to the global time server when the skew amount exceeds the skew threshold value.

3. The client device of claim 2, wherein the skew amount comparing unit compares a value obtained by multiplying a weight value and the skew amount with the skew threshold value.

4. The client device of claim 1, further comprising:
   a local clock compensation unit which receives the global time data to compensate the local clock.

5. The client device of claim 1, further comprising:
   a rendering unit which renders the first media data and the second media data in accordance with the first playout time and the second playout time.

6. The client device of claim 1, wherein the skew threshold value is a maximum skew value at which a user does not perceive asynchronous rendering of the first media data and the second media data.

7. The client device of claim 1, wherein the types of the first media data and second media data are one of video and audio type, haptic and video type, and haptic and audio type.

8. The client device of claim 1, wherein the first media data and the second media data are media data captured from a corresponding sensor of the other client device.

9. A local clock skew compensation method which is performed in a client device which is synchronized with an other client device to provide a time-aware service, the local clock skew compensation method comprising:
   receiving first media data and second media data captured by a sensor of the other client device;
   scheduling a first playout time of the first media data using a first local time data, and scheduling a second playout time of the second media data using a second local time data; and
   compensating a local clock by requesting global time data to a global time server when a skew amount corresponding to a difference between the first playout time and the second playout time exceeds a skew threshold value,
   wherein the first media data and the second media data are different types of media data, and the skew threshold value in accordance with types of the first media data and the second media data is stored in a database.

10. The local clock skew compensation method of claim 9, further comprising:
    compensating the local clock of the client device by requesting the global time data to the global time server at a beginning of the time-aware service.

11. The local clock skew compensation method of claim 9, wherein the skew threshold value is a maximum skew value at which a user does not perceive asynchronous rendering of the first media data and the second media data.

12. The local clock skew compensation method of claim 9, wherein the types of the first media data and second media data are one of video and audio type, haptic and video type, and haptic and audio type.

\* \* \* \* \*